Jan. 11, 1938. L. DEMBOSKI ET AL 2,105,139

WELDING NUT

Original Filed April 20, 1936

INVENTORS
LEO DEMBOSKI
JOHN KAY
BY Richey & Watts
ATTORNEYS

Patented Jan. 11, 1938

2,105,139

UNITED STATES PATENT OFFICE 2,105,139

WELDING NUT

Leo Demboski and John Kay, Berea, Ohio, assignors to The Ohio Nut & Bolt Company, Berea, Ohio, a corporation of Ohio Original application April 20, 1936, Serial No. 75,286, now Patent No. 2,073,467. Divided and this application January 28, 1937, Serial No. 122,821

5 Claims. (Cl. 85—32)

This invention relates to an improved welding nut or the like. This application is a division of our co-pending United States patent application, Serial No. 75,286, filed April 20, 1936, which issued March 9, 1937, as Letters Patent Number 2,073,467.

Our invention contemplates the rapid and economical manufacture of welding nuts or similar articles having a plurality of projections extending from a surface, which projections are adapted to be electrically welded to a base or supporting piece, which have characteristics which make them especially suitable for the purpose intended. It has been found advantageous, particularly in sheet metal work such as automobile bodies and the like, to weld or otherwise suitably secure a heavier piece of metal to the thin metal, the heavier metal being threaded to receive a screw. Such devices are commonly termed "welding nuts" although actually, inasmuch as they are securely fastened to a supporting member, they are not nuts in the sense that this term is used in the mechanical arts.

We are aware that bolts having projections or bosses on the underside or outside of their heads have been manufactured and that such bolts have been secured in position by causing the projections to be fused or welded to the supporting stock.

Among the objects of our invention are: the provision of a welding nut having a plurality of outwardly extending welding projections which welding projections are of uniform height whereby the nut may be properly welded in position; and the provision of a nut or the like of the type described having improved physical characteristics which greatly facilitate its use.

The above and other objects of our invention will appear from the following description of one form of our improved product and one embodiment of a method for manufacturing same, it being understood, of course, that both the product and method may be varied to suit varying conditions and to produce articles for various purposes.

Referring now to the drawing—

Figure 1:
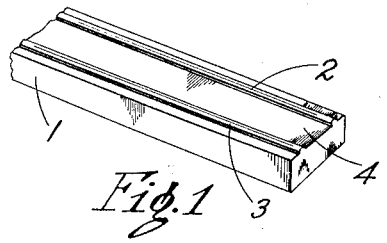
Figure 1 is a perspective view of a portion of the formed bar or blank from which our nuts are made.
Figure 2:
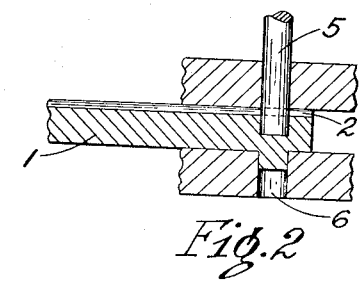
Figure 2 is a diagrammatic illustration of the first step of the process in which the hole is punched.

The nut illustrated in the drawing is of a simple square form. It will be understood that hexagonal or other shapes might readily be made but the present description will be confined to the square nut. In our preferred method of manufacturing claimed in our said co-pending patent application, bar or blank stock 1 (Fig. 1) is formed by rolling or any other suitable process and is provided with outwardly projecting ribs 2 and 3, preferably longitudinally extending although they could be formed transversely of the bar if desired. These ribs project from the surface 4 of the body of the bar 1 a distance equal to the distance the finished welding projection is from the finished nut. This bar 1 is fed longitudinally into a nut making machine of any desired type which is equipped with the proper dies. As the machine per se forms no part of the present invention it is not described or illustrated, it being sufficient to explain that the first operation which takes place is preferably the punching out of the hole. This is illustrated in Figure 2 in which a punching die 5 is adapted to be moved downwardly and co-acts with an aperture 6 in the bottom die to punch out the hole which is later tapped to the proper thread.

Figure 3:
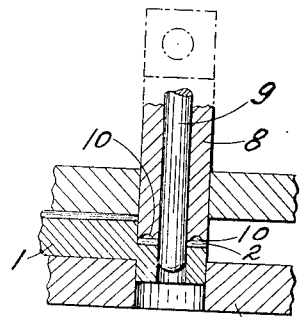
Figure 3 is a view similar to Figure 2 but illustrating the second step in which the nut is severed from the bar.

After the punching operation, in the preferred practice of our method, the nut is severed from the bar stock 1, as is illustrated in Figure 3. The severing die preferably includes a bottom die member 7 having an aperture of the desired size and shape and an upper die member 8 which includes a locating pin 9 adapted to enter the hole which has previously been formed by the punch 5. As is seen in Figure 3 the face of the upper die member 8 is provided with cup shaped apertures 10. In forming the described square nut four of these apertures are provided, each being disposed in a corner of the die. During the shearing operation (Fig. 3) the face of the die 8 engages the top of the ribs 2 and 3 and co-acts with the bottom die 7 to shear the nut from the bar 1.

Figure 4:
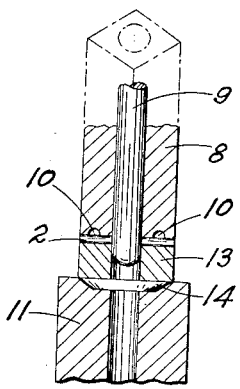
Figure 4 illustrates the beginning of the third or projection forming and chamfering step.
Figure 5:
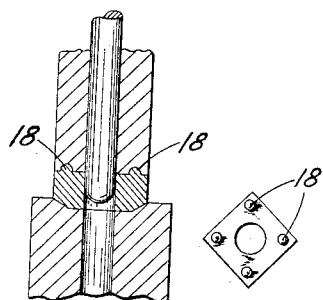
Figure 5 is a view generally similar to Figure 4 but illustrating the end of the projection forming step.
Figure 6:
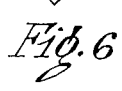
Figure 6 is a plan view of the nut looking at the side which is engaged by the upper die as it appears after the step of Figures 4 and 5 is completed.

The next step in the process is to extrude or displace all of the metal of the ribs 2 and 3 except that which is allowed to remain to form the welding projections. This step is illustrated in Figures 4 and 5. These sectional views are taken on a line diagonally across the corners of the nut while Figure 3 illustrates a section taken on a line drawn parallel to one side of the nut. The bottom die 11 is formed with portions 14 which cause the corners of the nut to be chamfered, as is seen at 12 in Figure 8. The upper die 8 (Fig. 4) forces the nut 13 down into the chamfered recess 14 in the lower die 11. The guide pin 9 holds the nut in proper position relative to the dies and the pressure exerted on the die 8 causes the ribs 2 and 3 to be flattened out except where the apertures 10 occur in the face of the die 8. The chamfered portion of the bottom die 11 and the downward movement of the upper die 8 co-act to cause the surface of the nut 13 on which the welding projections are to be formed to be flattened and the ribs 2 and 3 reduced to the level of the surface of the nut blank.

Figure 7:
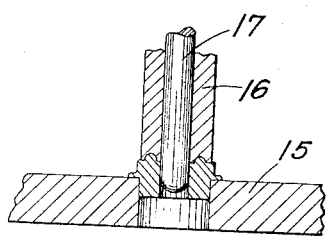
Figure 7 is a view generally similar to Figures 2, 3, 4 and 5 but illustrating the trimming operation for removing the flash or burr.
Figure 8:
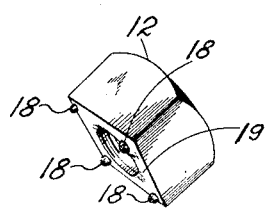
Figure 8 is a perspective view of the finished, tapped nut.

Figure 5 illustrates the nut after this step has taken place except that, as will be understood, a certain amount of burr or flash may occur where the metal of the ribs 2 and 3 is flattened and where the corners of the nut are chamfered. In practice the lower die 11 may conveniently be disposed below the die 7 of Figure 3 and a single stroke of the die 8 will serve to sever the nut chamfer or reduce the corners and form the welding projections. After the completion of these steps the nut, which is now finished except for removing any burr which may have been formed, and threading the hole, may be pushed through a burr trimming die 15 (Fig. 7) by means of an upper die member 16 which includes a guide or centering pin 17. The hole in the nut may then be threaded in any suitable manner and the resulting product will be as illustrated in Figure 8.

By simultaneously forming the chamfer or reduced portion on the corners of one surface of the nut and squeezing down the ribs 2 and 3 on the other surface of the nut the depressions 10 in the die 8 are always completely and uniformly filled with metal, but without substantial working thereof with resultant change in physical characteristics from the parent metal of the article, so that each welding projection 18 of the finished nut will extend out from the surface 19 of the nut substantially exactly the same distance and each projection will have the same mass and form. It is important in devices of this type that these welding projections be of exactly the same dimensions so that they may be properly welded in place for use. If one projection is lower than the others it either will not be properly welded and the others may be subjected to too much heat and burn or the nut may not be parallel to the surface to which it is attached. Our improved process provides means for maintaining absolutely uniformity of the welding projections. Our improved product has proved to be readily adaptable to rapid and accurate production.

In our welding nuts the metal of the welding projections has not been substantially disturbed or cold worked during the nut forming operation. Therefore, this metal retains its original soft condition of the parent bar stock material and is most suitable for welding. It will be understood by those skilled in the art that the drawing illustrating the steps of our method are merely diagrammatic and that in actual practice one or more of the steps might be combined in a single punching operation or in some cases the order in which the steps are performed might be modified. Also, the form of our nut and the arrangement of the welding projections may be varied greatly while retaining the advantages of our improved product. Therefore, although we have described in considerable detail the illustrated embodiment of our improved article, we do not wish to be limited to the particular article herein described, but claim as our invention all forms thereof coming within the scope of the appended claims.

We claim:

1. As an article of manufacture, a welding nut formed from bar stock and having a plurality of welding projections extending a uniform distance outwardly from one surface thereof, said welding projections being of metal having substantially the same physical characteristics as the bar stock from which the nut was formed and spaced from the outer and inner edges of said surface of the nut.

2. As an article of manufacture, a welding nut having its corners chamfered on one side thereof and having welding projections extending outwardly from the other side thereof and being located substantially directly opposite said chamfered portions and spaced from both the outer and innner edges of the side of the nut.

3. As an article of manufacture, a welding nut or the like having a plurality of welding projections extending out from the body of the article, spaced from all edges of said article, and characterized by the metal of said projections having substantially the same physical characteristics as the body of the article.

4. As an article of manufacture, a welding nut or the like having a plurality of welding projections extending out from the body of the article, spaced from all edges of said article, and characterized by the metal of said projections having substantially the same physical characteristics as the body of the article, the mass of said projections being relatively small as compared to the mass of the article.

5. As an article of manufacture, a welding nut or the like having chamfered or reduced portions on one side thereof, and welding projections on the opposite side thereof, said projections being disposed substantially directly opposite said reduced portions, and said chamfered portions having characteristics imparted to the parent metal of the article by cold working and the welding projections having substantially the same physical characteristics as the parent metal of the article.

LEO DEMBOSKI.
JOHN KAY.